United States Patent [19]

Nasar

[11] Patent Number: 5,315,190
[45] Date of Patent: May 24, 1994

[54] LINEAR ELECTRODYNAMIC MACHINE AND METHOD OF USING SAME

[75] Inventor: Syed A. Nasar, Lexington, Ky.

[73] Assignee: Stirling Technology Company, Richland, Wash.

[21] Appl. No.: 994,986

[22] Filed: Dec. 22, 1992

[51] Int. Cl.⁵ .......................................... H02H 41/00
[52] U.S. Cl. ...................... 310/12; 310/34; 310/30
[58] Field of Search ............ 310/12, 14, 16, 17, 310/23, 24, 30, 34, 35

[56] References Cited

U.S. PATENT DOCUMENTS

| | | | |
|---|---|---|---|
| 4,315,197 | 2/1982 | Studer | 318/135 |
| 4,501,980 | 2/1985 | Welburn | 310/12 |
| 4,827,163 | 5/1989 | Bhate et al. | 310/15 |

Primary Examiner—Emanuel T. Voeltz
Assistant Examiner—Judson H. Jones
Attorney, Agent, or Firm—Bernard L. Kleinke; Jerry R. Potts

[57] ABSTRACT

A linear electrodynamic machine includes mover and stator assemblies. The stator assembly includes an inner stator and an outer stator for defining a closed loop magnetic flux path. A magnet mounted on an outside portion of the stator assembly produces a constant flux extending through the magnetic flux path. The inner and outer stators form at least one pair of aligned spaced apart magnetic poles forming a gap. A group of slugs mounted on the mover assembly moves into and out of the gap to interact electrodynamically with the magnetic flux within the gap.

17 Claims, 6 Drawing Sheets

LINEAR ELECTRODYNAMIC MACHINE AND METHOD OF USING SAME

TECHNICAL FIELD

The present invention relates in general to an electrodynamic machine and a method of using it. More particularly, the invention relates to a homopolar permanent magnet linear electrodynamic alternator and method of using it in a highly efficient and effective manner.

BACKGROUND ART

There have been many different types and kinds of electrodynamic machines for generating electrical currents. For example, reference may be made to the following U.S. Pat. Nos. 2,842,688; 3,500,079; 3,542,495; 3,816,776; 3,891,874; 4,210,831; 4,395,649; 4,454,426; 4,542,311; 4,546,277; 4,602,174; 4,623,808; 4,642,547; 4,697,113; 4,937,481; and 4,945,269.

As disclosed in the foregoing patents, electrodynamic machines in the form of linear generators or alternators, generally include a stator having a predetermined number of magnetic poles for producing magnetic fields, and a mover which travels reciprocatively linearly relative to the poles. The magnetic fields are typically produced by electromagnets or permanent magnets. As the mover travels, electrical current is typically induced in the stator windings.

While such linear generators and alternators have been satisfactory for some applications, they have been relatively inefficient, due to unwanted and undesirable heat and power losses. For example, when permanent magnets are employed on the mover, heat generated by the magnets radiate radially into the machine windings, thus significantly reducing the efficiency of the operation, due to heat build-up and attendant losses.

Therefore, it would be highly desirable to have a new and improved electrodynamic machine, which greatly reduces heat losses, and which is highly efficient in its operation.

Another problem associated with such prior art machines is the loss of kinetic energy from oscillating the mover relative to the stator poles. For example, the windings and permanent magnets disposed on the prior known mover are undesirably heavy. Thus, energy is wasted to reciprocate the mover, due to the excessive weight of the mover itself.

Therefore it would be highly desirable to have a new and improved electrodynamic machine, which greatly reduces the amount of energy required to reciprocate the machine mover.

Such a machine should be highly efficient and effective in its operation. Also, it should be relatively less expensive to manufacture.

DISCLOSURE OF INVENTION

Therefore, the principal object of the present invention is to provide a new and improved linear electrodynamic machine, and method of using it, whereby losses are greatly reduced to enable it to be more efficient in its operation.

Another object of the present invention is to provide such a new and improved electrodynamic machine which is highly efficient in its operation, and relatively less expensive to manufacture.

Briefly, the above and further objects are realized by providing a linear electrodynamic machine, which is highly efficient in its operation.

A linear electrodynamic machine includes mover and stator assemblies. The stator assembly includes an inner stator and an outer stator for defining a closed loop magnetic flux path. A magnet mounted on an outside portion of the stator assembly produces a constant flux extending through the magnetic flux path. The inner and outer stators form at least one pair of aligned spaced apart magnetic poles forming a gap. A group of slugs mounted on the mover assembly moves into and out of the gap to interact electromagnetically with the magnetic flux within the gap.

In this manner, in accordance with the present invention, the magnet is disposed on the outer stator assembly to facilitate heat dissipation. The slugs on the mover are generally light in weight, to help provide a more efficient operation.

In one form of the invention, the stator and mover assemblies are flat and generally rectangularly shaped. The stator assembly is made from a plurality of axial laminations having a plurality of outer pole face members. The outer pole face members are spaced apart opposed to a corresponding set of inner pole face members and define a space therebetween for receiving the mover assembly therebetween.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figures 1, 2, 2A, 3:
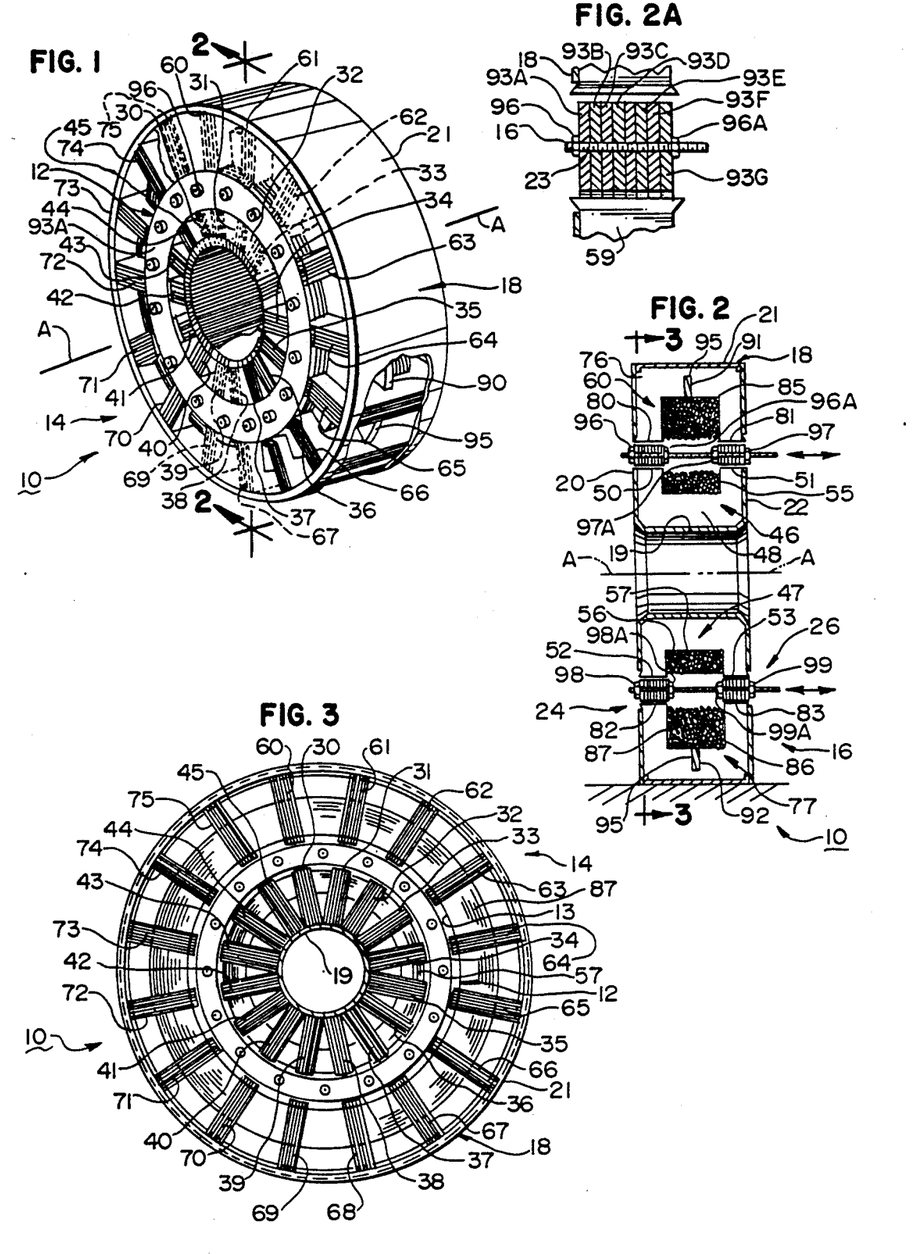
FIG. 1 is a partially cut away pictorial view of a linear electrodynamic machine, which is constructed in accordance with the present invention.
FIG. 2 is a diametrical sectional elevational view of the machine of FIG. 1, taken substantially on line 2—2 thereof.
FIG. 2A is a greatly enlarged fragmentary sectional elevational view of a slug portion of the mover of FIG. 2.
FIG. 3 is a front elevational face view of the machine of FIG. 1.

Referring now to the drawings and more particularly to FIGS. 1-3 thereof, there is shown a linear electrodynamic reciprocating machine 10 which is constructed in accordance to the present invention. In the preferred form of the present invention, as will be shown and described herein, the machine 10 is adapted to convert mechanical energy into electrical energy and thus, functions as a linear alternator. In this regard, the machine 10 is adapted to be driven by a free piston Stirling engine (not shown) or the like. While the preferred form of the invention is a linear alternator, those skilled in the art will understand that the machine 10 may also function as an electric motor, converting electrical energy into mechanical energy.

The electrodynamic machine 10 generally comprises an annular shaped mover assembly 12 and an annular shaped stator assembly 14 which are arranged and constructed for reciprocating axial movement relative to one another. The machine 10 also includes an annular opening or space 13 which is dimensioned for receiving the mover assembly 12 therein for substantially friction free axial movement relative to the stator assembly 14.

The mover assembly 12 coacts dynamically with the stator assembly 14 for converting mechanical energy to electrical energy. In the preferred form of the present invention, the mover assembly 12 is connected a set of connecting rods indicated generally at 16 which are attached to a drive shaft plate (not shown) which in turn is driven by the Stirling engine (not shown) for reciprocating the mover assembly 12 relative to the stator assembly 14. Thus, in the preferred form of the present invention, the machine 10 functions as a linear alternator converting mechanical energy to electrical energy. A casing 18 having a pair of annular openings 20 and 22 surrounds and protects the stator assembly 14 from hostile environments.

As best seeing in FIGS. 1-3, the mover assembly 12 generally includes two sets of spaced apart slugs or concentric ring laminations indicated generally at 24 and 26 respectively. The concentric rings are stacked relative to a common axis A and are secured to the connecting rods 16 by a series of nuts such as nuts 96-99 and 96A-99A.

Considering now the stator assembly 14 in greater detail with reference to FIGS. 1-3, the stator assembly 14 generally includes a plurality of spaced apart radially extending inner stator lamination sets 30-45 for defining a plurality of inner stator poles, such as inner stator poles and inner stator winding slots, such as inner stator poles 50-53 (FIG. 2) and inner stator winding slots 55-56. The inner stator lamination sets 30-45 are mounted to an inner portion 19 of the casing 18. In this regard, they are bonded to the inner portion 19 by any conventional bonding or welding techniques.

The stator assembly 14 also includes a plurality of spaced apart radially extending outer stator lamination sets 60-75 for defining a plurality of outer stator poles such as outer stator poles 80-83 (FIG. 2), outer stator winding slots, such as outer stator winding slots 85-86 and a plurality of magnet receiving slots, such as magnet receiving slots 90-92. The outer stator lamination sets 60-75 are mounted to an outer portion 21 of the casing 18 by any conventional bonding or welding technique.

For the purpose of producing magnetic flux, the stator assembly 14 also includes an annular shaped permanent magnet 95 which is received and mounted within the plurality of magnet receiving slots, such as the slots 90-92. The magnet 95 have an axial polarity.

As best seen in FIGS. 2 and 3, the inner stator poles such as inner poles 50-51 are opposed spaced apart from corresponding ones of the outer stator poles such as outer poles 80-81 via the space 13. In this regard, the inner and outer poles are sufficiently spaced apart to allow the sets of annular lamination sets 24 and 26 to pass therebetween for inducing a voltage across the stator assembly 14 as will be described hereinafter in greater detail.

The stator assembly 14 also includes an annular shaped inner stator winding 57 and an annular shaped outer stator winding 87 for carrying electrical current induced by the interaction between them, over assembly 12 and stator assembly 14. The inner stator winding 57 is spaced apart opposed to the outer stator winding 87 and is surrounded on three sides by the inner stator lamination sets 30-45. The outer stator winding 87 is surrounded on three sides by the outer stator lamination sets 60-75. As best seen in FIG. 2, the inner and outer stator lamination sets 30-45 and 60-75 form a plurality of closed loop magnetic flux paths that will be described in greater detail hereinafter.

Figure 4:
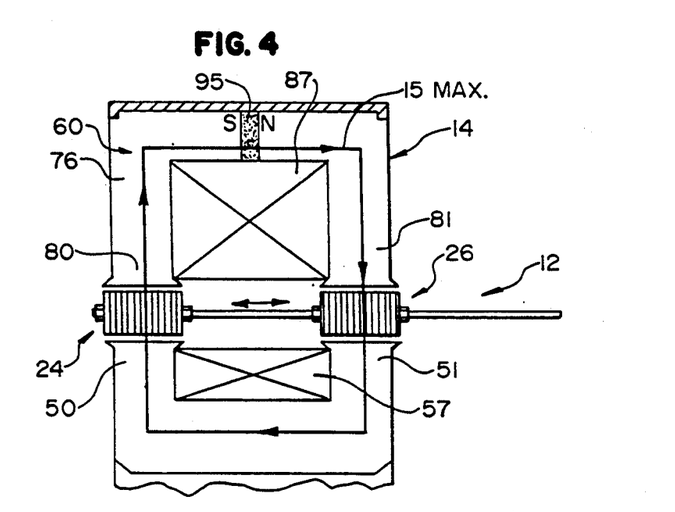
FIG. 4 is a fragmentary, enlarged diagrammatic transverse sectional view of the machine of FIG. 1, illustrating the mover in a leftward stroke position.
Figures 5, 6:
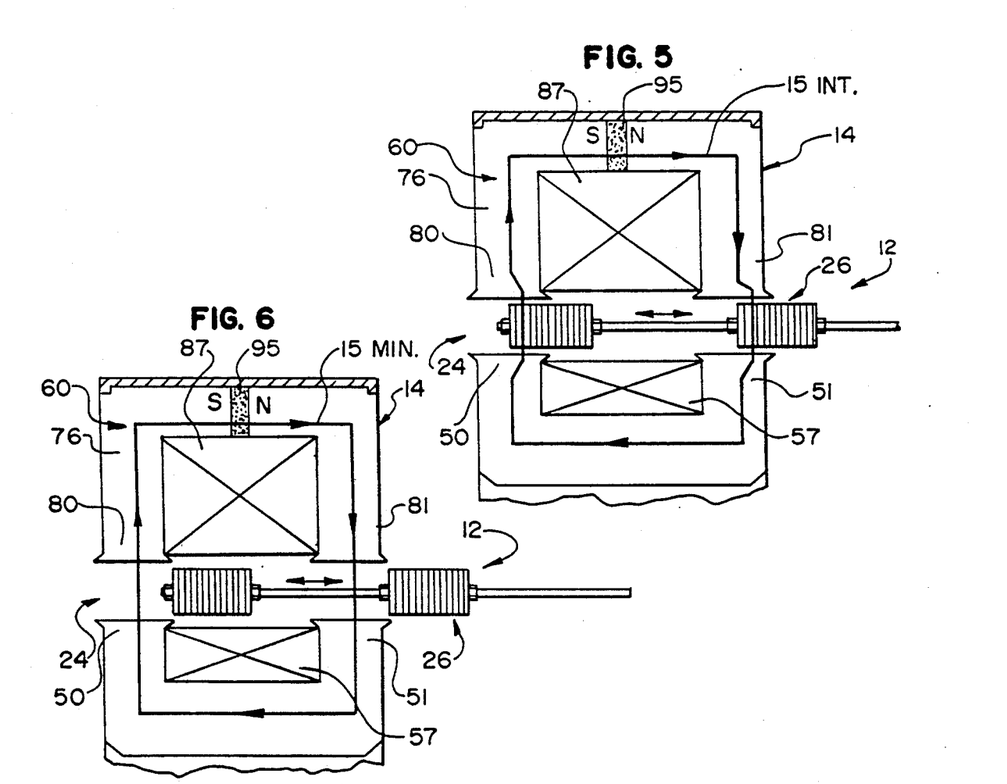
FIG. 5 is a diagrammatic view of the machine of FIG. 1, similar to FIG. 4 but illustrating the mover in a middle or central stroke position.
FIG. 6 is a diagrammatic view of the machine of FIG. 1, similar to FIG. 4 but illustrating the mover in a rightward stroke position.

In use, as best seen in FIGS. 4-6, as the mover assembly 12 is moved reciprocatively within the stator assembly 14, the amount of magnetic flux surrounding or linking the inner and outer stator windings or coils 57 and 87 respectively is changed thus, inducing a voltage in the coils 57 and 87. In this regard, the magnitude of the induced voltage is equal to the time rate of change of flux linkages of the coil.

The above described process begins as in FIG. 4 where the mover assembly 12 is illustrated in an extreme left end stroke position relative to the stator assembly 14 linking the inner and outer windings 57 and 87 with a maximum amount of flux 15 MAX traveling in a clockwise direction relative to poles 50-51 and 80-81 and with a maximum amount of flux traveling in a counter clockwise direction relative to poles 52-53 and 82-83. FIG. 6 illustrates the mover assembly 12 in an extreme right end stroke position relative to the stator assembly 14 linking the windings 57 and 87 with a minimum amount of flux 15 MIN. FIG. 5 illustrates the mover assembly 12 in a middle stroke position relative to the stator assembly 14 linking the windings 57 and 87 with an intermediate amount of flux 15 INT.

Considering now the mover assembly 12 in greater detail with reference to FIGS. 1, 2, 2A and 3, the sets of concentric rings 24 and 26 are substantially identical so only set 24 will be described hereinafter in greater detail.

Referring now to FIG. 2A, the set of concentric rings 24 includes a plurality of concentric rings 93A-93H. Each of the concentric rings 93A-93H is dimensioned for friction free movement within the annular space 13 between the inner and outer stator poles of the machine 10.

As best seen in FIGS. 1 and 2, each of the concentric rings includes a plurality of equally spaced apart mounting holes 23 dimensioned to receive therein the connecting rods 16. Each rod 16 is threaded for receiving the securing nuts thereon for helping to secure the concentric rings thereon, such as the nuts 96 and 96A for securing the rings 93A-93H to the rod 16.

Figure 7:
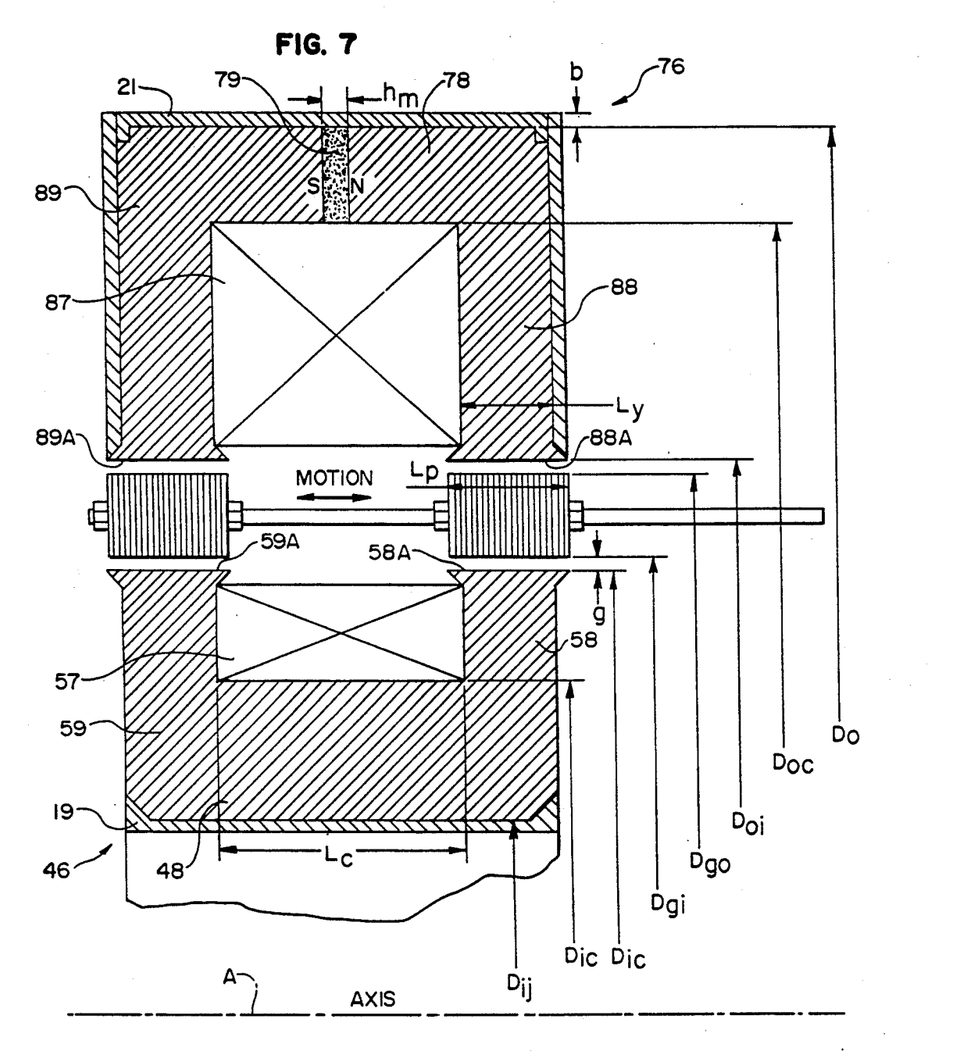
FIG. 7 is an enlarged, fragmentary diagrammatic transverse sectional view of the machine of FIG. 1.
Figure 7A:
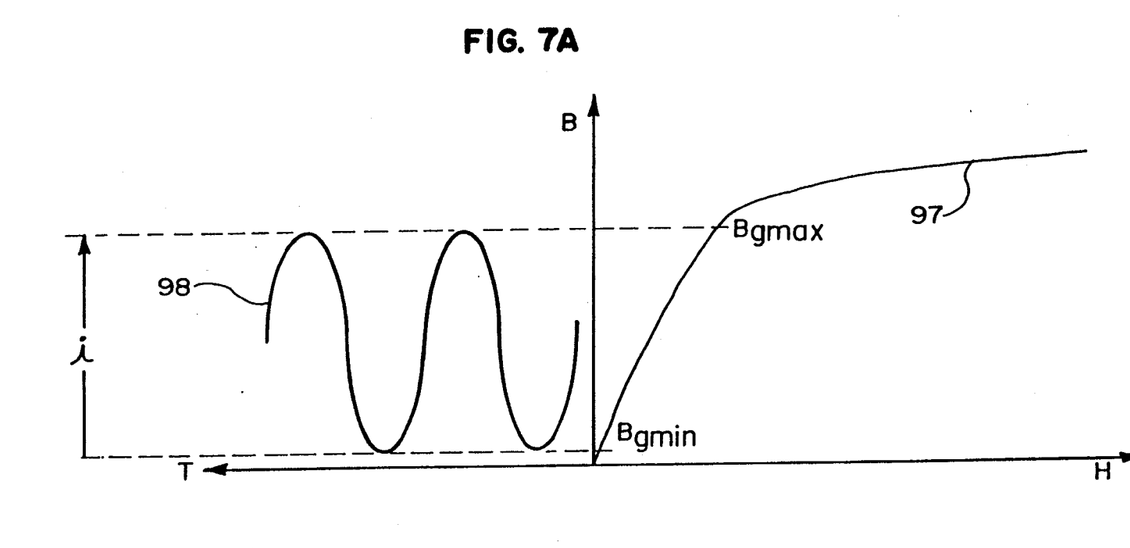
FIG. 7A is a magnetizing curve for the machine of FIG. 1.

Referring now to FIG. 7A, there is shown a flux density (B) verus magnetizing force (H) curve 97 illustrating the minimum and maximum amounts of flux linking the windings 57 and 87 as the mover assembly 12 reciprocates relative to the stator assembly 14. In this regard, as the mover assembly 12 and stator assembly 14 move relative to one another, electrodynamic forces are created to convert mechanical energy to electrical energy. Thus for example, when the machine 10 is coupled to a Sterling engine, the interaction between the mover assembly 12 and the stator assembly 14 produces an alternating current in the stator windings having a frequency proportional to the frequency of the drive shaft moving the mover reciprocatively into and out of the air gaps within the machine 10. The alternating current produced by the machine 10 is shown for illustrative purposes by a curve 98.

Considering now the inner stator lamination sets 30-45 in greater detail with reference to FIGS. 2, 3 and 7, the sets 30-45 are spaced equally apart radially about the center axis A of the machine 10. In the preferred form of the present invention a total of sixteen inner lamination sets are illustrated. Those skilled in the art however will understand that a greater number or lesser number of sets may be employed so long as a corresponding greater or lesser number or outer stator lamination sets are employed. It will also be understood by those skilled in the art that both an even or odd number of inner and outer lamination sets may be employed so long as the total number of inner and outer lamination sets equals one another. As each of the inner lamination sets 30-45 are substantially identical only set 30 will be considered in greater detail.

Considering now the inner lamination set 30 in greater detail with reference to FIGS. 2, 3 and 7, the inner lamination set 30 generally includes a plurality of U-shaped axial laminations including an individual lamination 46 which is opposed to an individual inner lamination 47 forming part of inner lamination set 38. The individual lamination within the sets, such as individual lamination 46 and 47 are substantially identical so only lamination 46 will be described in greater detail.

As best seen in FIG. 7, the inner stator lamination 46 generally includes an axial leg member 48 mounted to the inner casing portion 19. The inner axial leg member 48 is substantially parallel to the central axis A and is interconnected to a pair of inner right pole yoke and inner left pole yoke members 58 and 59 respectively. The inner right pole yoke member 58 and the inner left pole yoke member 59 are disposed substantially perpendicular to the inner axial leg member 48. The inner pole yoke members 58 and 59 are equally dimensioned and have a width $L_y$ of about 15 millimeters.

The members 58 and 59 each include a tip portion or an inner pole face portion, such as a face portion 58A and 59A which help form the inner stator poles 50 and 51 respectively. In this regard, when the individual lamination are stacked to form the set 30, the tip portions of the laminations form a pair of axially spaced apart inner stator poles, such as the inner stator poles 50 and 51, each having a predetermined inner pole face axial length substantially equal to $L_p$. The axial length $L_p$ of the inner stator pole face is about 20 millimeters.

The right pole yoke member 58 and left pole yoke member 59 are spaced apart by a distance $L_c$ which defines the axial length of the inner stator winding 57 relative to the inner stator lamination set 30. The preferred axial length $L_c$ is about 138 millimeters.

The axial length of the inner lamination set 30 is defined by the following formula:

$$L_y+L_y+L_c = Inner\ stator\ axial\ length \tag{1}$$

Considering now the outer stator lamination sets 60-75 in greater detail with reference to FIGS. 2, 3 and 7, the sets 60-75 are spaced equally apart radially about the center axis A of the machine 10. As each set of the outer stator lamination sets 60-75 are substantially identical only set 60 will be considered in greater detail.

Considering now the outer lamination set 60 in greater detail with reference to FIGS. 2, 3 and 7, the outer lamination set 60 is disposed opposed and spaced apart from inner lamination set 30 and generally includes a plurality of U-shaped laminations including an individual lamination 76 which is opposed to an individual outer lamination 77 forming part of outer lamination set 68. The individual laminations within the sets 60 and 68 such as the individual lamination 76 and 77 are substantially identical so only lamination 76 will be described in greater detail.

As best seen in FIG. 7, the outer stator lamination 76 generally includes an outer axial leg member 78 mounted to the outer casing portion 21. The outer axial leg member 78 is substantially parallel to the central axis A and includes a cut out portion 79 which forms part of the magnet receiving slot 90. In this regard, when the individual laminations are stacked to form the set 30, the individual cutout portions, such as the cut out portion 79 are aligned to form the magnet receiving slot 90.

The outer axial member 78 is interconnected to a pair of outer right pole yoke and outer left pole yoke members 88 and 89 respectively. The outer right member 88 and the outer left member 89 are disposed substantially perpendicular to the outer axial leg member 78. The outer pole yoke members 88 and 89 are equally dimensioned and have a width $L_y$ which is substantially equal to the width of the inner pole yoke members 58 and 59.

The outer pole yoke members 88 and 89 each include an outer tip portion or an outer pole face portion, such as an outer pole face 88A and 89A respectively which help from the outer poles 80 and 81 respectively. When the individual laminations are stacked to form the set 60, the outer tip portions of the laminations form a pair of axially spaced apart outer stator poles, such as the outer stator poles 80 and 81, each having a predetermined outer pole face axial length substantially equal to $L_p$. The axial length $L_p$ of each outer pole face, such as face 88A is substantially equal to the axial length $L_p$ of each inner pole face, such as face 58A.

The right member 88 and the left member 89 are spaced apart by a distance $L_c$ which defines the axial length of the outer stator winding 87 relative to the outer stator lamination set. The axial length of the outer stator winding 87 is substantially equal to the axial length $L_c$ of the corresponding inner stator winding 57.

The overall axial length of the outer lamination 60 is defined by the following formula:

$$L_y+L_y+L_c = outer\ stator\ axial\ length \tag{2}$$

Table 1 provides the preferred dimensions of the inner and outer stator laminations 46 and 76 respectively relative to FIG. 7.

TABLE 1
Design Data

| Item | Dimension |
|---|---|
| airgap, g | 0.4 mm |
| outer diameter, $d_o$ | 300 mm |
| See FIG. 7, $D_{oc}$ | 255 mm |
| See FIG. 7, $D_{oj}$ | 175 mm |
| See FIG. 7, $D_{go}$ | 174.2 mm |
| See FIG. 7, $D_{gi}$ | 134.2 mm |
| See FIG. 7, $D_{jo}$ | 133.4 mm |
| See FIG. 7, $D_{jc}$ | 93.4 mm |
| See FIG. 7, $D_{jj}$ | 33.4 mm |
| axial length of permanent magnet, hm | 5 mm |
| pole yoke, $L_y$ | 15 mm |
| pole face, $L_p$ | 20 mm |
| winding axial length, $L_c$ | 138 mm |
| total axial length, L | 168 mm |
| Number of turns of outer winding, $N_1$ | 130 |
| Number of turns of inner winding, $N_2$ | 70 |
| Total number of turns | 200 |
| Thickness of stainless steel outer shell, b | 1 mm |

Figure 8:
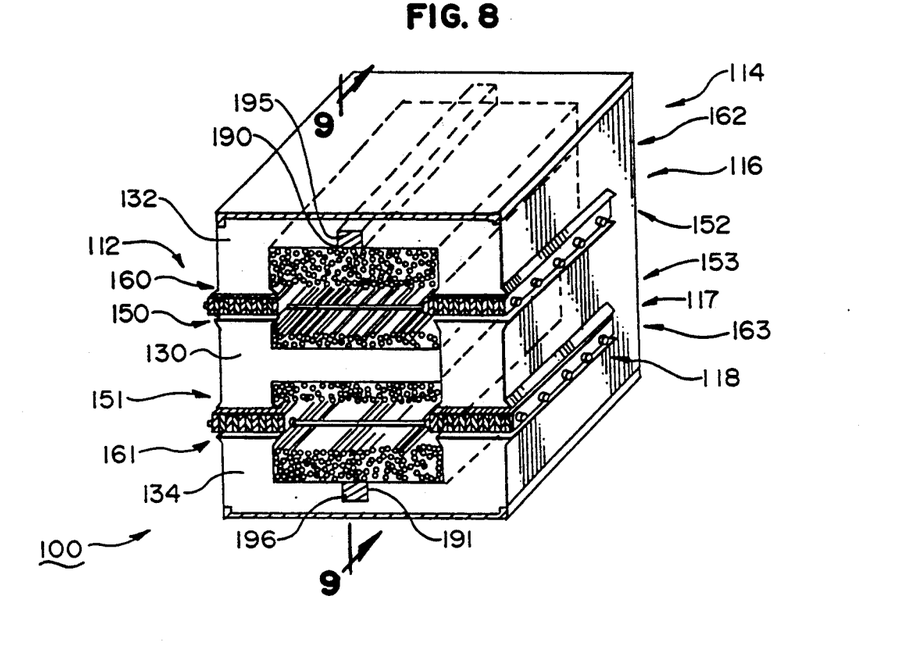
FIG. 8 is a partially cut away pictorial view of another linear electrodynamic machine, which is constructed in accordance with the present invention.
Figure 9:
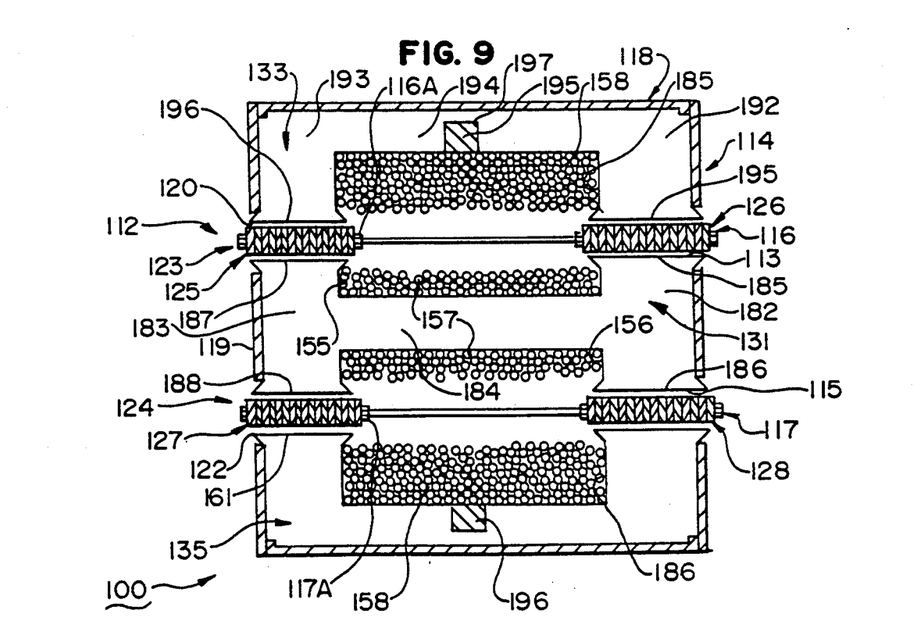
FIG. 9 is a sectional elevational view of the machine of FIG. 8, taken substantially on line 9—9 thereof.

Referring now to the drawings, and more particularly to FIGS. 8 and 9 thereof, there is shown another linear electrodynamic machine 100, which is also constructed in accordance with the present invention. In the preferred form of the present invention, the machine 100 is generally flat in its shape and is adapted to convert mechanical energy into electrical energy and thus, functions as a linear alternator. In this regard, the machine 100 is adapted to be used with a free piston Stirling engine (not shown) or the like. While the preferred from of the present invention is a linear alternator, those skilled in the art will understand the machine 100 may also function as an electrical motor converting electrical energy into mechanical energy.

Similar to the cylindrical machine 10 of FIG. 1, the machine 100 has its magnetic flux produced by a permanent magnet at the outer portion of the device for advantageous heat dissipation. Also, according to the invention, slugs are used on the mover within the gap or gaps for relatively light weight operation.

The electrodynamic machine 100 generally comprises a substantially flat rectangular shaped plunger or mover assembly indicated generally at 112 and a rectangular box-like stator assembly 114 which are arranged and constructed for reciprocating movement relative to one another. The machine 100 also includes a pair of rectangular shaped openings 113 and 115 which are dimensioned for receiving the mover assembly 112 therein for substantially friction free reciprocative movement relative to the stator assembly 114.

In the preferred form of the present invention, the mover assembly 112 is connected to the Stirling engine (not shown) by a set of connecting rods indicated generally at 116 and 117 for reciprocating the mover assembly 112 relative to the stator assembly 114. A casing 118 having a pair of openings 120 and 122 surrounds and protects the stator assembly 114 from hostile environments.

As best seen in FIGS. 8 and 9, the mover assembly 112 generally includes two sets 123 and 124 of pairs of stacked groups of elongated bars or slugs indicated at 125, 126 and 127, 128 respectively. The stacked slug groups 125, 126 and 127, 128 are secured to the rods 116 and 117 respectively by sets of nuts, such as sets 116A and 117A, respectively.

Considering now the stator assembly 114 in greater detail with reference to FIGS. 8 and 9, the stator assembly 114 generally includes an I-shaped inner stator unit 130 and a pair of U-shaped outer stator units 132 and 134 which are disposed spaced apart on opposite sides of the inner stator unit 130 via the openings 120 and 122 respectively.

The inner stator unit 130 include a plurality of inner stator laminations including for example, a lamination 131 for defining a plurality of inner stator poles 150–153 and a pair of inner stator winding slots 155–156. The inner stator laminations are mounted to an outer portion 119 of the casing 118. In this regard, they are bonded to the outer portion 119 by any conventional bonding or welding technique.

The outer stator units 132 and 134 include a plurality of outer stator laminations, including for example a lamination 133 and 135 respectively for defining a plurality of pairs of outer stator poles 160, 161 and 162, 163 respectively. As the outer stator units 132 and 134 are otherwise substantially identical, only outer stator unit 132 will be described hereinafter in greater detail.

Considering now the outer stator unit 132 in greater detail with reference to FIGS. 8 and 9, the outer stator assembly 132 generally includes a plurality of U-shaped outer stator laminations for defining the outer stator poles 160, 161 and an outer stator winding slot 185. The outer stator laminations of the outer stator assembly 132 are stacked in alignment for defining a centrally disposed magnet receiving slot 190. A corresponding magnet receiving slot 191 is disposed in the outer stator assembly 134. In this regard, a pair of elongated magnets 195 and 196 are disposed in slots 190 and 191 respectively for producing magnetic flux. The outer stator laminations of assembly 132 are bonded to the outer portion 119 of the casing by any conventional bonding or welding techniques.

Figure 10:
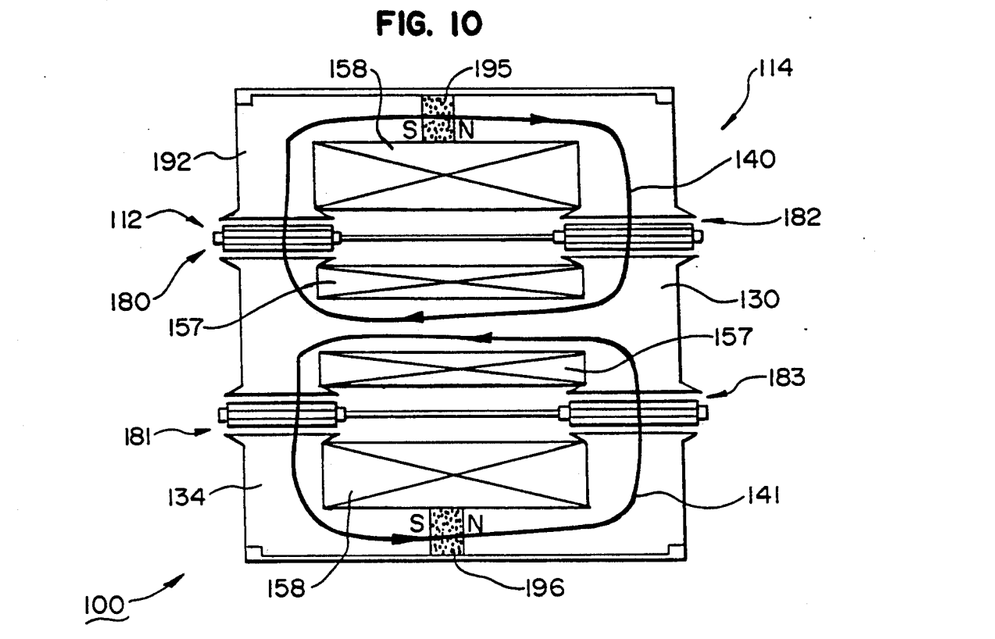
FIG. 10 is an enlarged diagrammatic transverse elevational view of the machine of FIG. 8, illustrating the mover in a central or middle stroke position.

As best seen in FIG. 10, the magnet 195 produces a magnetic flux which flows in a clockwise direction along a closed loop magnetic flux path indicated generally at 140, while the magnet 196 produces magnetic flux which flows in a counter clockwise direction along another closed loop magnetic flux path indicated generally at 141. In order to enable the magnetic flux produced by magnets 195 and 196 to flow along closed loop paths 140 and 141 respectively, the inner stator poles 150, 151 and 152, 153 are disposed opposite the outer stator poles 160, 161 and 162, 163 respectively. A set of air gaps or spaces, 180, 181 and 182, 183 separate the poles which are disposed opposite from one another.

The stator assembly 114 includes an inner stator winding or coil 157 disposed in slots 155 and 156 and an outer stator winding or coil 158 disposed in slots 185 and 186. The stator windings 157 and 158 are connected electrically together for carrying electrical current induced by the interaction between the mover assembly 112 and the stator assembly 114.

Figure 11:
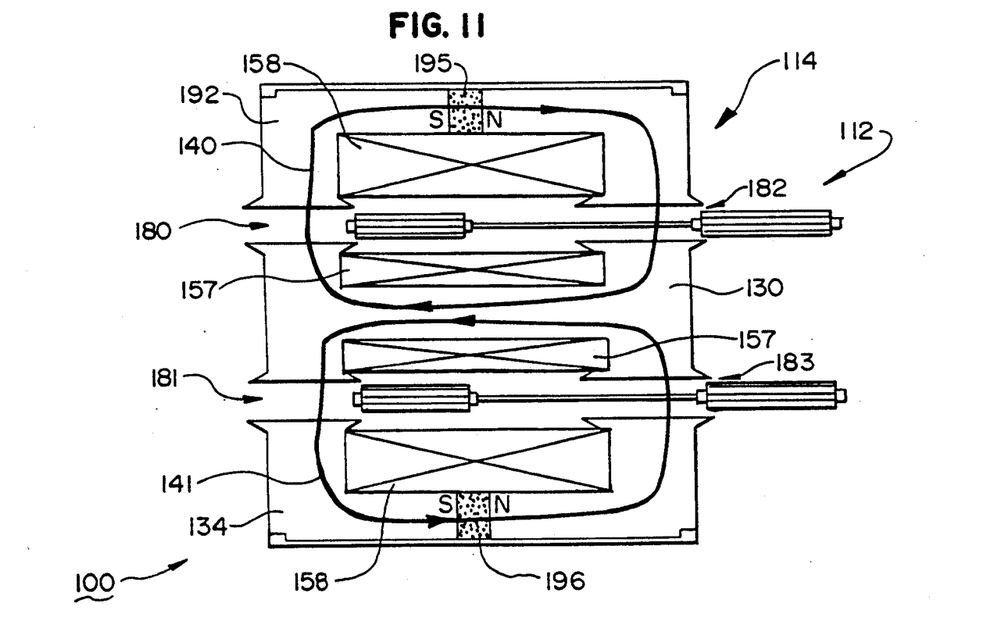
FIG. 11 is a diagrammatic view of the machine of FIG. 8, similar to FIG. 10 but illustrating the mover in a rightward stroke position.

As best seen in FIGS. 10 and 11, the inner stator winding 157 and outer stator winding 158 are each surrounded by the closed loop magnetic flux paths 140 and 141. In this regard, as the mover assembly 112 is oscillated reciprocatively rectilinearly within the stator assembly 114, the amount of magnetic flux surrounding or linking the inner and outer stator windings 157 and 158 respectively changes, thus inducing a voltage in the windings 157 and 158. In this regard, the magnitude of the induced voltage is equal to the time rate charge of flux linkages of the windings 157 and 185.

Considering now the plurality of inner stator lamination in greater detail, only inner lamination 131 will be described in greater detail as each of the laminations are substantially identical.

Referring now to FIG. 8, the inner lamination 131 has a unitary construction and generally includes a right leg member 182 and a left leg member 183 which are integrally connected by an intermediate leg member 184. The right leg member 182 and the left leg member 183 are spaced apart by the intermediate leg member 184 to help define the inner winding receiving slots 155 and 156 respectively.

The right leg member 182 includes a pair of inner pole faces 185 and 186 respectively which help define the inner stator poles 152 and 153 respectively. The left leg member 183 also includes a pair of inner pole faces 187 and 188 respectively which help define the inner stator poles 150 and 151 respectively.

Considering now the outer stator units 132 and 134 in greater detail, only lamination 133 will be described in greater detail, as each of the outer stator laminations are substantially identical.

Referring now to FIG. 9, the outer stator lamination 133 has a unitary construction and generally includes a right leg member 192 and a left leg member 193 which are integrally connected by an intermediate leg member 194. The right leg member 192 and the left leg member 193 are spaced apart by the intermediate leg member 194 to help define the outer stator winding slot 185.

The right leg member 192 includes an outer pole face 195 which helps define the outer pole 162. The left leg member 193 includes an outer pole face 196 which helps define the outer pole 160. Each of the outer pole faces 195 and 196 are disposed opposite the corresponding inner pole faces 185 and 187 respectively.

The intermediate leg member 194 includes a cut-out portion 197 which helps define the magnet receiving slot 190.

The reciprocation action of the mover assembly 112 relative to the stator assembly 114 is illustrated in FIGS. 10 and 11. FIG. 10 illustrates the mover assembly 112 and stator assembly 114 in a maximum flux position. FIG. 11 illustrates the mover assembly 112 and stator assembly 114 in a minimum flux position. As the reciprocative action of machine 100 is similar to machine 10 and will not be described further.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A linear electrodynamic machine, comprising:
    inner stator means for defining a portion of a closed loop magnetic flux path;
    outer stator means for defining another portion of said closed loop magnetic flux path;
    magnetic means mounted at said outer stator means for producing magnetic flux extending in the substantially closed loop magnetic flux path to facilitate heat dissipation from said outer means;
    winding means having conductor means linking said closed loop magnetic flux path for relative electrodynamic interaction;
    said inner stator means and said outer stator means forming at least one pair of aligned spaced apart magnetic poles for defining a gap therebetween forming a portion of said closed loop magnetic flux path;
    mover means;
    slug means mounted on said mover means for moving reciprocatively along a linear path of travel into and out of said gap to interact with the magnetic flux within said gap so that electrodynamic interaction occurs between said winding means and said magnetic flux.

2. A method of converting mechanical energy to electrical energy, comprising:
    using means defining a closed loop magnetic flux path, and using an inner portion of the path;
    using an outer portion of said closed loop magnetic flux path, said outer portion and inner portion being spaced apart from one another;
    using at least one pair of aligned spaced apart magnetic poles forming a gap for passing magnetic flux therebetween;
    causing magnetic flux to flow along said closed loop magnetic flux path including said gap; and
    moving a pair of spaced apart slug means into and out of said aligned gaps to interact with the magnetic flux within said gap.

3. A linear electrodynamic machine, comprising:
    a plurality of spaced apart radially extending inner stator means for defining a plurality of inner stator poles and inner winding slots;
    a plurality of spaced apart radially extending outer stator means opposed spaced apart from corresponding ones of said plurality of inner stator means for defining a plurality of outer stator poles and outer winding slots;
    permanent magnet means mounted to said outer stator means radially spaced apart from said plurality of outer stator poles for producing magnetic flux to be carried along a closed loop magnetic flux path and for facilitating heat dissipation therefrom;
    inner winding means mounted within said plurality of said inner winding slots for carrying electrical current;
    outer winding means mounted within said plurality of said outer winding slots and electrically connected to said inner winding means for carrying electrical current;
    means defining a space for separating said inner stator pole, from said outer stator poles; and
    annular shaped mover means arranged for reciprocation within said means defining a space between said plurality of inner stator poles and said plurality of outer stator poles.

4. A linear electrodynamic machine according to claim 1, wherein said outer and inner stator means each include a plurality of axially laminated ferromagnetic segments.

5. A linear electrodynamic machine according to claim 3, wherein said means defining a space includes an annular shaped space extending between each pair of outer and inner stators.

6. A linear electrodynamic machine according to claim 1, wherein said mover means includes at least two sets of spaced apart slug means for helping to complete said closed loop magnetic flux path between said inner stator means and said outer stator means.

7. A linear electrodynamic machine according to claim 6, wherein said slug means includes a plurality of stacked rings having a predetermined axis width for helping to pass magnetic flux between said outer poles to said inner poles as said mover means moves reciprocatively therebetween.

8. A linear electrodynamic machine according to claim 1, wherein said magnet means is a ring shaped permanent magnet.

9. A method according to claim 2, further including:
said causing magnetic flux including permanent magnet means having axial polarity;
linking coil means with the magnetic flux, said coil means being disposed between pairs of axially spaced apart inner and outer stator pole means;
moving reciprocatively a plurality of non-magnetic concentric rings within a space between said pairs of axially spaced apart inner and outer stator pole means to induce a voltage in said coil means.

10. A linear electrodynamic machine, comprising:
outer stator means having outer pole means for defining an outer magnetic flux path therebetween;
inner stator means having inner pole means for defining an inner magnetic flux path therebetween;
means defining a space between said outer and inner stator means for completing a closed loop magnetic flux path between said outer magnetic flux path and said inner magnetic flux path;
mover means arranged for reciprocation within said means defining a space between said outer pole means and said inner pole means; and
axial permanent magnet means for producing axial magnetic flux to be carried along said closed loop magnetic flux path.

11. A linear electrodynamic machine according to claim 10, wherein said inner and outer stator means are both generally rectangular shaped.

12. A linear electrodynamic machine according to claim 11, wherein said inner and outer stator means are both generally flat.

13. A linear electrodynamic machine, comprising:
outer stator means for defining an outer portion of a closed loop magnetic flux path;
inner stator means for defining an inner portion of said closed loop magnetic flux path;
said outer and inner stator means each having at least one pair of axially spaced apart poles and a coil mounted therebetween for carrying electrical current;
said outer and inner stator mean poles being spaced apart opposed to one another for defining a space to complete said closed loop magnetic flux path;
axial permanent magnet means mounted to said outer stator means for linking the outer and inner stator mean coils with magnetic flux; and
mover means arranged for reciprocation within said space between said outer and inner stator mean poles;
whereby a voltage is induced in the outer and inner stator mean coils as said mover means moves reciprocatively in said space to change the magnetic flux linking the coils.

14. A linear electrodynamic machine according to claim 13, wherein said outer and inner stator means each include a plurality of axially laminated ferromagnetic segments.

15. A linear electrodynamic machine according to claim 13, wherein said means defining a space includes an annular shaped space extending between each pair of outer and inner stators.

16. A linear electrodynamic machine according to claim 13, wherein said axial permanent magnetic means is annular shaped.

17. A linear electrodynamic machine according to claim 13, wherein said mover means includes a plurality of stacked rings having a predetermined axial width for helping to pass magnetic flux between said outer poles to said inner poles as said mover means moves reciprocatively therebetween.

* * * * *